(12) United States Patent
Lin et al.

(10) Patent No.: US 9,291,872 B1
(45) Date of Patent: Mar. 22, 2016

(54) ELECTROPHORETIC DISPLAY DESIGN

(71) Applicant: SIPIX IMAGING, INC., Fremont, CA (US)

(72) Inventors: Craig Lin, San Jose, CA (US); Robert A. Sprague, Saratoga, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 0 days.

(21) Appl. No.: 13/760,654

(22) Filed: Feb. 6, 2013

Related U.S. Application Data

(60) Provisional application No. 61/596,075, filed on Feb. 7, 2012.

(51) Int. Cl.
*G02F 1/167* (2006.01)
*G02F 1/1333* (2006.01)
*G02B 1/06* (2006.01)

(52) U.S. Cl.
CPC . *G02F 1/167* (2013.01); *G02B 1/06* (2013.01); *G02F 1/133377* (2013.01); *G02F 2001/1672* (2013.01)

(58) Field of Classification Search
CPC . G02F 1/1333; G02F 1/133377; G02F 1/167; G02F 2001/1672; G02B 1/06
USPC ............... 359/296, 290, 316; 345/107
See application file for complete search history.

(56) References Cited

U.S. PATENT DOCUMENTS

| | | | |
|---|---|---|---|
| 6,172,798 B1 * | 1/2001 | Albert ............... | B41J 3/4076 264/4 |
| 6,795,229 B2 * | 9/2004 | Liang ............... | G02F 1/167 252/572 |
| 6,930,818 B1 | 8/2005 | Liang et al. | |
| 7,729,033 B2 * | 6/2010 | Souriau ............ | G02B 1/06 359/247 |
| 7,834,842 B2 * | 11/2010 | Ikeda ............... | G02F 1/167 345/107 |
| 7,903,323 B2 * | 3/2011 | Uchino ............ | G02F 1/167 359/296 |
| 8,542,428 B2 * | 9/2013 | Bae ................. | G02F 1/167 345/107 |
| 2010/0045860 A1 * | 2/2010 | Roosendaal ...... | G02F 1/133514 348/448 |
| 2011/0069001 A1 * | 3/2011 | Lee ................. | G02B 26/026 345/107 |
| 2011/0097549 A1 * | 4/2011 | Verschueren ..... | G02F 1/167 428/166 |
| 2011/0133627 A1 * | 6/2011 | Yi .................... | G02F 1/167 313/483 |
| 2013/0208343 A1 * | 8/2013 | Yang ............... | G02F 1/167 359/296 |

FOREIGN PATENT DOCUMENTS

WO    WO 01/67170    9/2001

OTHER PUBLICATIONS

Allen, K. (Oct. 2003). Electrophoretics Fulfilled. *Emerging Displays Review: Emerging Display Technologies*, Monthly Report—Oct. 2003, 9-14.

(Continued)

*Primary Examiner* — Thomas K Pham
*Assistant Examiner* — Nicholas Pasko
(74) *Attorney, Agent, or Firm* — Perkins Coie LLP

(57) ABSTRACT

The present invention is directed to electrophoretic displays comprising microcups of a first shape and the microcups of a second shape, wherein each of the microcups of the first shape is surrounded by the microcups of the second shape, and the second shape is 90% or less of the first shape in area. The present electrophoretic displays comprise novel microcup designs, which may reduce the appearance of defects in the display images.

4 Claims, 11 Drawing Sheets

(56) References Cited

OTHER PUBLICATIONS

Bardsley, J.N. & Pinnel, M.R. (Nov. 2004) Microcup™ Electrophoretic Displays. *USDC Flexible Display Report*, 3.1.2. pp. 3-12-3-16.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.

Chen, S.M. (Jul. 2003.) The Applications for the Revolutionary Electronic Paper Technology. *OPTO News& Letters*, 102, 37-41. (in Chinese, English abstract attached).

Chen, S.M. (May 2003) The New Application and the Dynamics of Companies. *TRI*. 1-10. (In Chinese, English abstract attached).

Chung, J., Hou, J., Wang, W., Chu, L.Y., Yao, W., & Liang, R.C. (Dec. 2003). Microcup® Electrophoretic Displays, Grayscale and Color Rendition. *IDW*, AMD2/EP1-2, 243-246.

Ho, Andrew. (Nov. 2006) *Embedding e-Paper in Smart Cards, Pricing Labels & Indicators.* Presentation conducted at Smart Paper Conference Nov. 15-16, 2006, Atlanta, GA, USA.

Ho, C., & Liang, R.C. (Dec. 2003). *Microcup® Electronic Paper by Roll-to-Roll Manufacturing Processes.* Presentation conducted at FEG, Nei-Li, Taiwan.

Ho, Candice. (Feb. 1, 2005) *Microcup® Electronic Paper Device and Application.* Presentation conducted at USDC 4th Annual Flexible Display Conference 2005.

Hou, J., Chen, Y., Li, Y., Weng, X., Li, H. and Pereira, C. (May 2004). Reliability and Performance of Flexible Electrophoretic Displays by Roll-to-Roll Manufacturing Processes. *SID Digest*, 32.3, 1066-1069.

Kleper, M., Miller, P., Miller L. (Oct. 2003) An Investigation of the Emerging and Developing Technologies Related to the Generation Beyond Print-on-Paper. *Advanced Display Technologies*, Oct. 2003, pp. 13-15, Rochester Institute of Technology (R.I.T.).

Lee, H., & Liang, R.C. (Jun. 2003) SiPix Microcup® Electronic Paper—An Introduction. *Advanced Display*, Issue 37, 4-9 (in Chinese, English abstract attached).

Liang, R.C. (Feb. 2003) *Microcup® Electrophoretic and Liquid Crystal Displays by Roll-to-Roll Manufacturing Processes.* Presentation conducted at the Flexible Microelectronics & Displays Conference of U.S. Display Consortium, Phoenix, Arizona, USA.

Liang, R.C. (Apr. 2004). *Microcup Electronic Paper by Roll-to-Roll Manufacturing Process.* Presentation at the Flexible Displays & Electronics 2004 of Intertech, San Fransisco, California, USA.

Liang, R.C. (Oct. 2004) *Flexible and Roll-able Displays/Electronic Paper—A Technology Overview.* Paper presented at the METS 2004 Conference in Taipei, Taiwan.

Liang, R.C., & Tseng, S. (Feb. 2003). *Microcup® LCD, A New Type of Dispersed LCD by A Roll-to-Roll Manufacturing Process.* Paper presented at the IDMC, Taipei, Taiwan.

Liang, R.C., (Feb. 2005) *Flexible and Roll-able Displays/Electronic Paper— A Brief Technology Overview.* Flexible Display Forum, 2005, Taiwan.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Chung, J., Wang, X., Pereira, C., & Chen, Y. (May 2003). Microcup® Active and Passive Matrix Electrophoretic Displays by A Roll-to-Roll Manufacturing Processes. *SID Digest*, vol. 34, Issue 1, pp. 838-841, 20.1.

Liang, R.C., Hou, J., Zang, H.M., & Chung, J. (Feb. 2003). *Passive Matrix Microcup® Electrophoretic Displays.* Paper presented at the IDMC, Taipei, Taiwan.

Liang, R.C., Hou, J., Zang, H.M., Chung, J., & Tseng, S. (Feb. 2003). Microcup® Displays: Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) << Format Flexible Microcup® Electronic Paper by Roll-to-Roll Manufacturing Process >>, Presentation conducted at the 14th FPD Manufacturing Technology EXPO & Conference.

Nikkei Microdevices. (Dec. 2002) Newly-Developed Color Electronic Paper Promises—Unbeatable Production Efficiency. *Nikkei Microdevices*, p3. (in Japanese, with English translation).

Sprague, R.A. (Sep. 23, 2009) SiPix Microcup Electrophoretic Epaper for Ebooks. *NIP 25*, 2009 pp. 460-462. (Presentation conducted on Sep. 23, 2009 at the 25th Int'l Conference on Digital Printing Technologies, Digital Fabrication 2009 (NIP 25) by Society for Imaging Science and Technology, in Louisville, Kentucky, USA. ).

Wang, X., Kiluk, S., Chang, C., & Liang, R.C. (Feb. 2004). Mirocup® Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51 (in Chinese, with English abstract).

Wang, X., Li, P., Sodhi, D., Xu, T. and Bruner, S. et al., (Feb. 2006) *Inkjet Fabrication of Multi-Color Microcup® Electrophorectic Display.* The Flexible Microelectronics & Displays Conference of U.S. Display Consortium.

Wang, X., Zang, H.M. and Li, P. (Jun. 2006) Roll-to-Roll Manufacturing Process for Full Color Electrophoretic film. *SID Digest*, 2006, pp. 1587-1589.

Zang, H.M, Hwang, J.J., Gu, H., Hou, J., Weng, X., Chen, Y., et al. (Jun. 2004). Threshold and Grayscale Stability of Microcup® Electronic Paper. *Proceeding of SPIE-IS&T Electronic Imaging*, SPIE vol. 5289, 102-108.

Zang, H.M. & Hou, Jack, (Feb. 2005) *Flexible Microcup® EPD by RTR Process.* Presentation conducted at $2^{nd}$ Annual Paper-Like Displays Conference, Feb. 9-11, 2005, St. Pete Beach, Florida.

Zang, H.M. (Oct. 2003). *Microcup® Electronic Paper by Roll-to-Roll Manufacturing Processes.* Presentation conducted at the Advisory Board Meeting, Bowling Green State University, Ohio, USA.

Zang, H.M. (Feb. 2004). *Microcup Electronic Paper.* Presentation conducted at the Displays & Microelectronics Conference of U.S. Display Consortium, Phoenix, Arizona, USA.

Zang, H.M. (Sep. 2006) *Monochrome and Area Color Microcup®EPDs by Roll-to-Roll Manufacturing Process.* Presentation conducted at the Fourth Organic Electronics Conference and Exhibition (OEC-06), Sep. 25-27, 2006, Frankfurt, Germany.

Zang, H.M. (Feb. 2007) *Developments in Microcup® Flexible Displays.* Presentation conducted at the 6th Annual Flexible Display and Microelectronics Conference, Phoenix, AZ Feb. 6-8.

Zang, H.M., & Liang, R.C. (2003) Microcup Electronic Paper by Roll-to-Roll Manufacturing Processes. *The Spectrum*, 16(2), 16-21.

Zang, H.M., Wang, F., Kang, Y.M., Chen, Y. and Lin, W. (Jul. 2007.) *Microcup® e-Paper for Embedded and Flexible Designs.* IDMC'07, Taipei International Convention Center, Taiwan.

Zang, H.M., Wang, W., Sun, C., Gu, H., and Chen, Y. (May 2006) Monochrome and Area Color Microcup® EPDs by Roll-to-Roll Manufacturing Processes. *ICIS' 06 International Congress of Imaging Science Final Program and Proceedings*, pp. 362-365.

\* cited by examiner

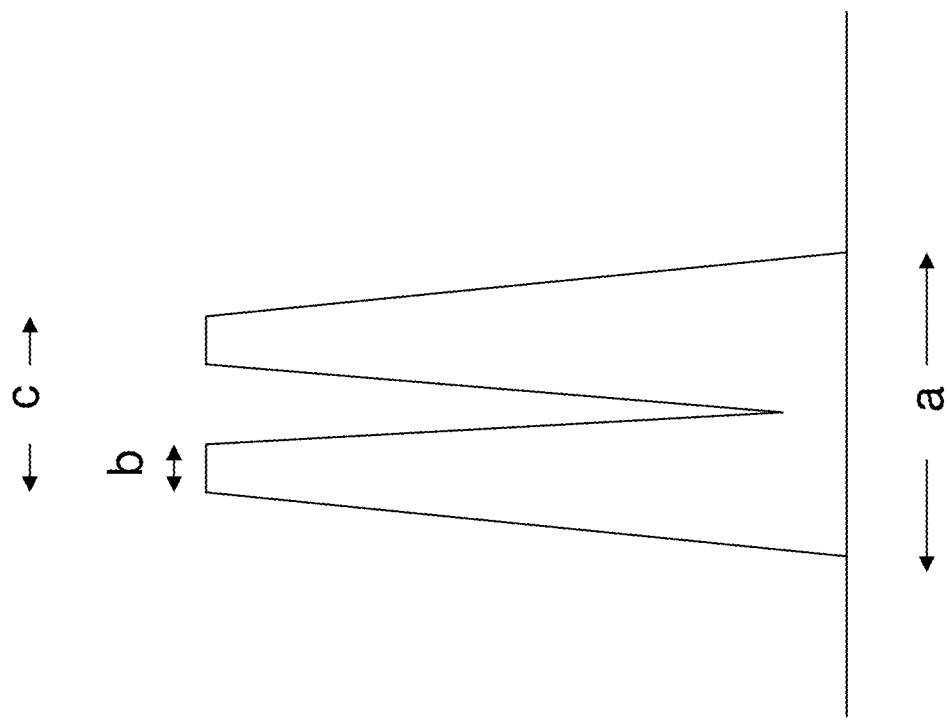

ELECTROPHORETIC DISPLAY DESIGN

This application claims priority to U.S. Provisional Application No. 61/596,075, filed Feb. 7, 2012; which is incorporated herein by reference in its entirety.

FIELD OF THE INVENTION

The present invention is directed to electrophoretic display designs, aiming to reduce noticeable defects of display images, without changing the fill factor of the display cells.

BACKGROUND OF THE INVENTION

U.S. Pat. No. 6,930,818 discloses an electrophoretic display based on the microcup technology. The patent describes the manufacture of microcups as display cells, by microembossing or imagewise exposure. The microcups are then filled with an electrophoretic fluid comprising charged pigment particles dispersed in a solvent or solvent mixture.

The top openings of the microcups traditionally may have the same size and shape and such microcups spread across the entire display surface. For example, all of the microcups may have a top opening of a square shape on the viewing side or all of the microcups may have a top opening of a hexagonal shape on the viewing side. For this type of design, one disadvantage is that if the partition wall between the two neighboring microcups has a defect, the two microcups will become connected. As a result, the defective wall provides a fluid path for the particles to move from one microcup to the next microcup. Due to the pumping action of operating the display, one microcup will turn white and one black, producing a visual display defect.

BRIEF DESCRIPTION OF THE DRAWINGS

FIG. 10 shows the dimensions of a double wall.

SUMMARY OF THE INVENTION

The first aspect of the present invention is directed to an electrophoretic display comprising microcups of a first shape and the microcups of a second shape, wherein a) both types of the microcups are filled with an electrophoretic fluid, b) each of the microcups of the first shape is surrounded by the microcups of the second shape, and c) the second shape is 90% or less of the first shape in area.

In one embodiment, the first shape is square and the second shape is rectangle. In another embodiment, the first shape is hexagon and the second shape is triangle. In one embodiment, the microcups have double walls.

The second aspect of the present invention is directed to an electrophoretic display comprising microcups wherein the microcups are filled with an electrophoretic fluid and have double walls.

In one embodiment, the display further comprises bridges between the two layers of the double wall. In one embodiment, the width of the base area of the double wall is about 10 to about 60 microns. In one embodiment, the width of the individual top area of the double wall is about 5 to about 20 microns. In one embodiment, the width of the total top area of the double wall is about 10 to about 60 microns.

DETAILED DESCRIPTION OF THE INVENTION

The first aspect of the present invention is directed to a design of the microcup arrangement.

In this design, the microcups are divided into two groups. The first group has a first shape and the second group has a second shape. In the context of this aspect of the present invention, the term "shape" refers to the two-dimensional shape of the top opening of a microcup, on the viewing side.

One microcup of the first shape is surrounded by the microcups of the second shape. Therefore, either there is no contact at all between any two microcups of the first shape or two microcups of the first shape may have only contact points.

Figure 1:
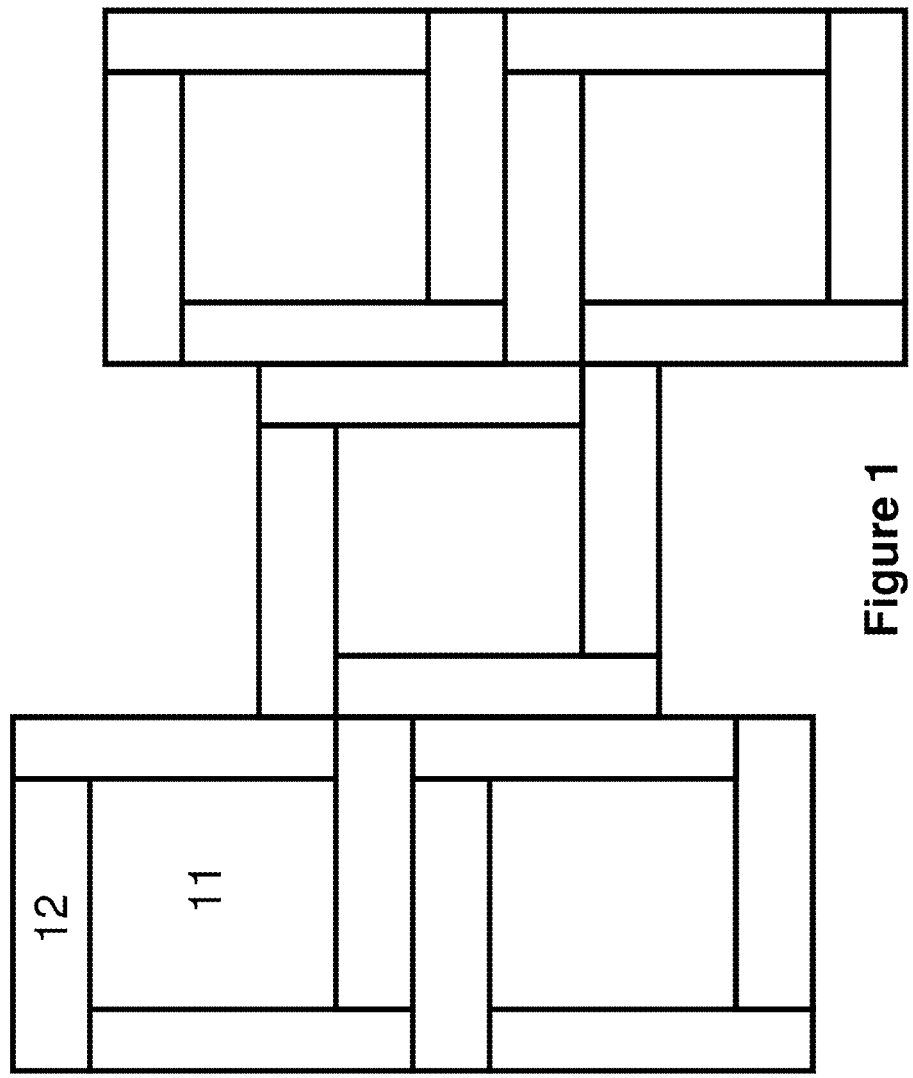
FIGS. 1 and 2 depict two examples of the microcup arrangement of the present invention.

FIG. 1 depicts an example in which a microcup of a first shape (square) (11) is surrounded by the microcups of a second shape (rectangular) (12). As shown, in this case, there is no contact between any two microcups of the first shape (11).

Figure 2:
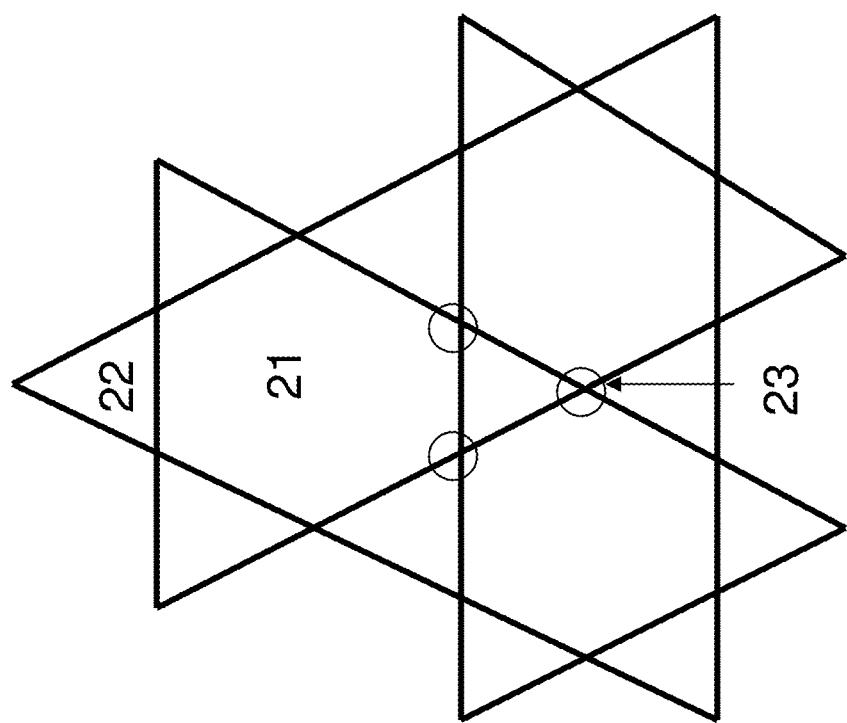

FIG. 2 is another example in which a microcup of a first shape (hexagonal) (21) is surrounded by the microcups of a second shape (triangular) (22). In this case, between the two microcups of the first shape, there are only contact points (23) and no wall contact between the microcups of the first shape.

The microcups of the second shape, in general, are smaller than the microcups of the first shape, in area. For example, the second shape may be 90% or less of the first shape, in area.

This unique microcup arrangement has the advantage that if there is defect in the partition wall between two neighboring microcups, the defect appearing between two neighboring microcups will be less noticeable by the naked eyes than the defect appearing between two neighboring microcups of the same larger size.

In addition, the fill factor is not changed significantly from that in a microcup pattern in which all of the microcups have the same shape.

Figure 3:
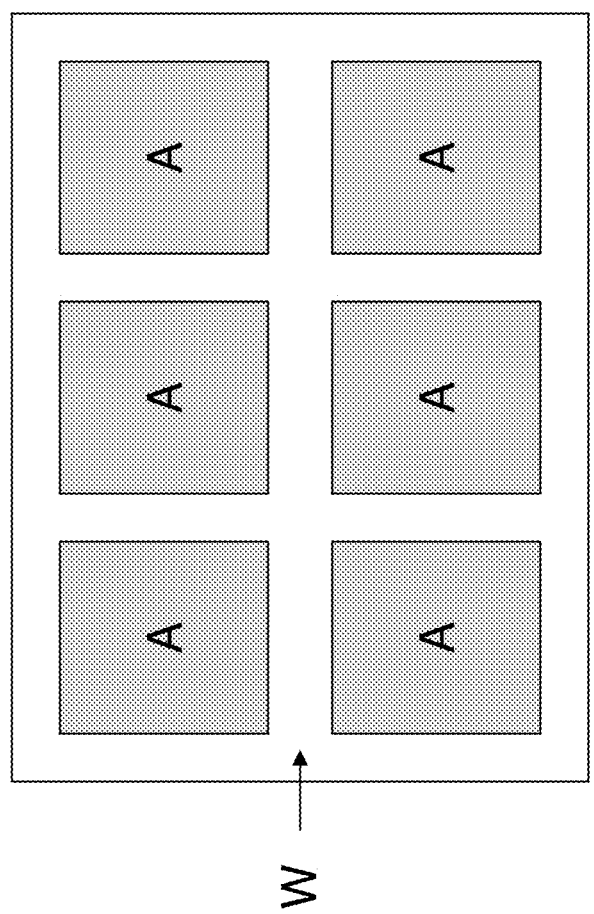
FIG. 3 illustrates the fill factor.

The fill factor is determined by the area other than the wall area divided by the entire area. As shown in FIG. 3, the fill factor is the sum of the area "A" divided by the sum of the area A and the area W (the wall area). The fill factor is important for image brightness.

In order to reduce the defect size, one may attempt to use microcups of the same shape but of a smaller size. However, for structural integrity, the thickness of the partition wall between the microcups has a lower limit. Therefore, to reduce the size of the microcups, one can only reduce the size of area "A" in FIG. 3. As a result, reducing the size of the microcups would inevitably lower the fill factor, thus causing the optical performance of the display device to suffer.

The second aspect of the invention is directed to a microcup structure having a double wall between the microcups.

Figure 4:
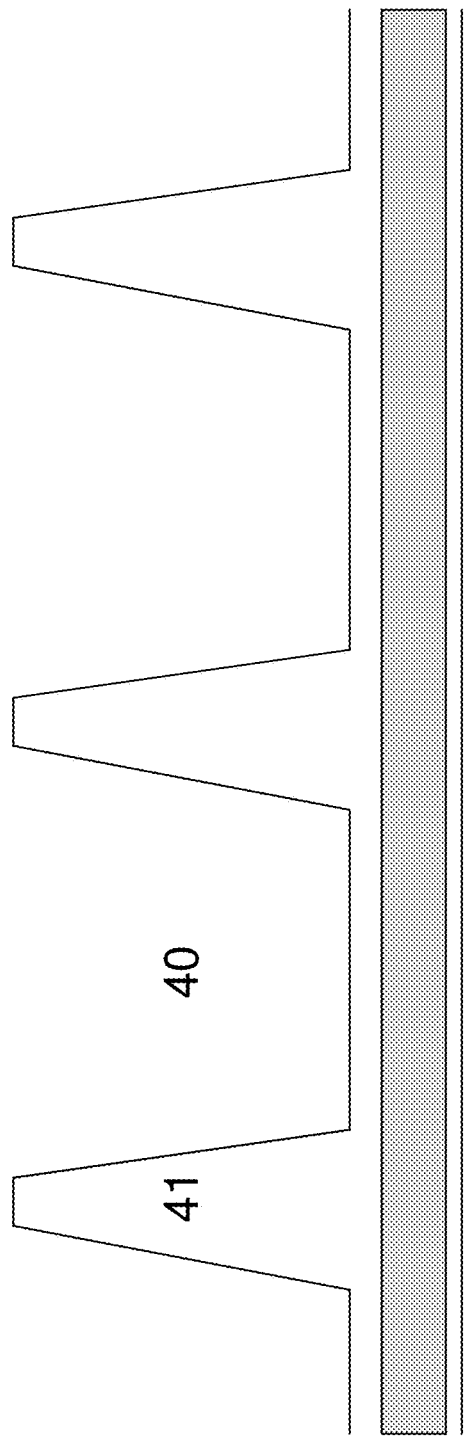
FIG. 4 depicts the cross-section view of a microcup structure having a single wall between the microcups.
Figure 5:
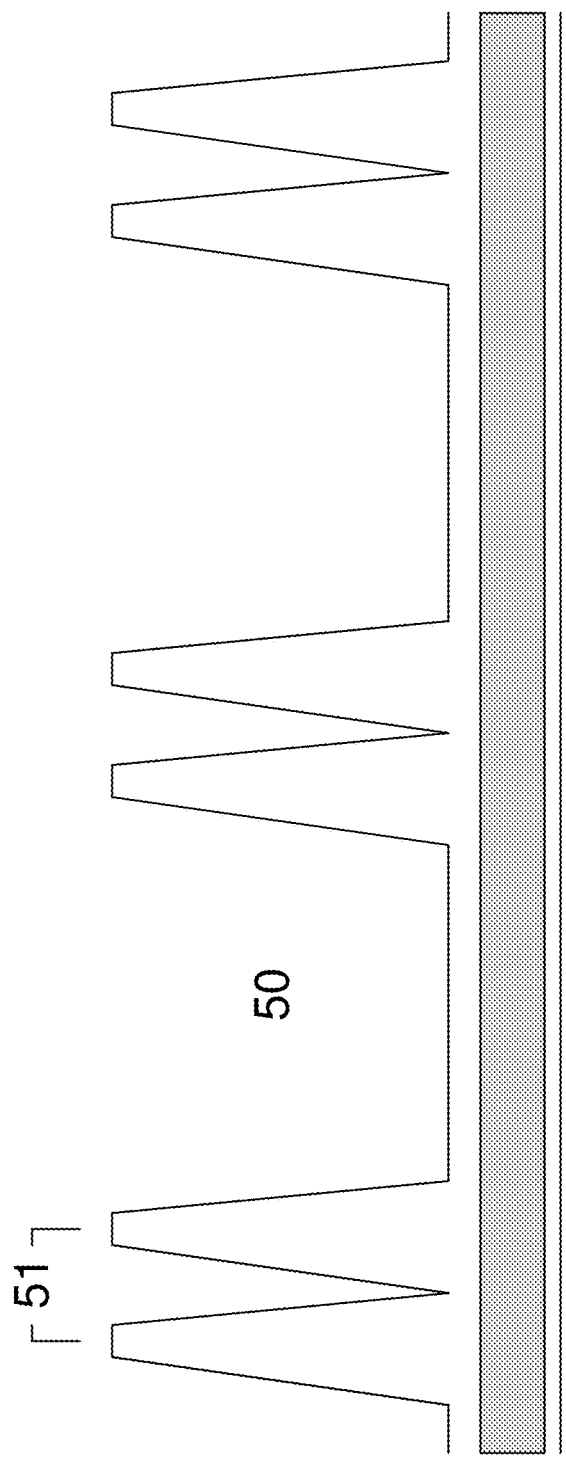
FIG. 5 depicts the cross-section view of a microcup structure having a double wall between the microcups.

FIGS. 4 and 5 are cross-section view of microcup structures. FIG. 4 is a microcup structure having a single wall (41) between the microcups (40). FIG. 5 illustrates the present invention with a double wall (51) between the microcups (50).

Figure 6:
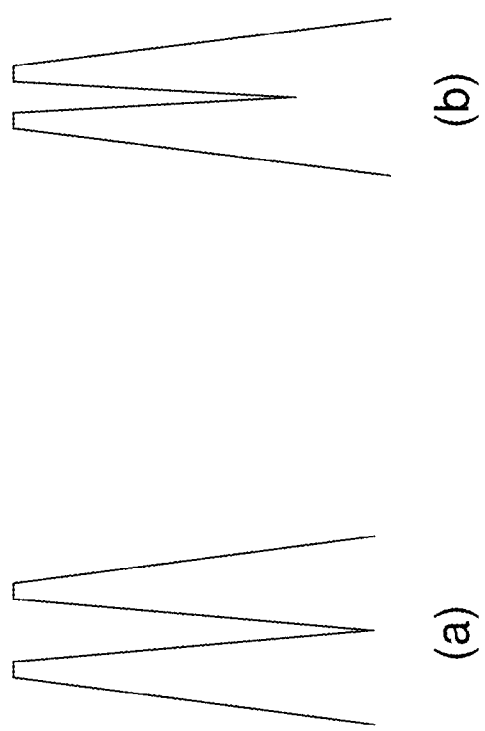
FIG. 6 illustrates different designs of the double partition wall.

FIG. 6 shows different designs of the double wall.

Figure 7A:
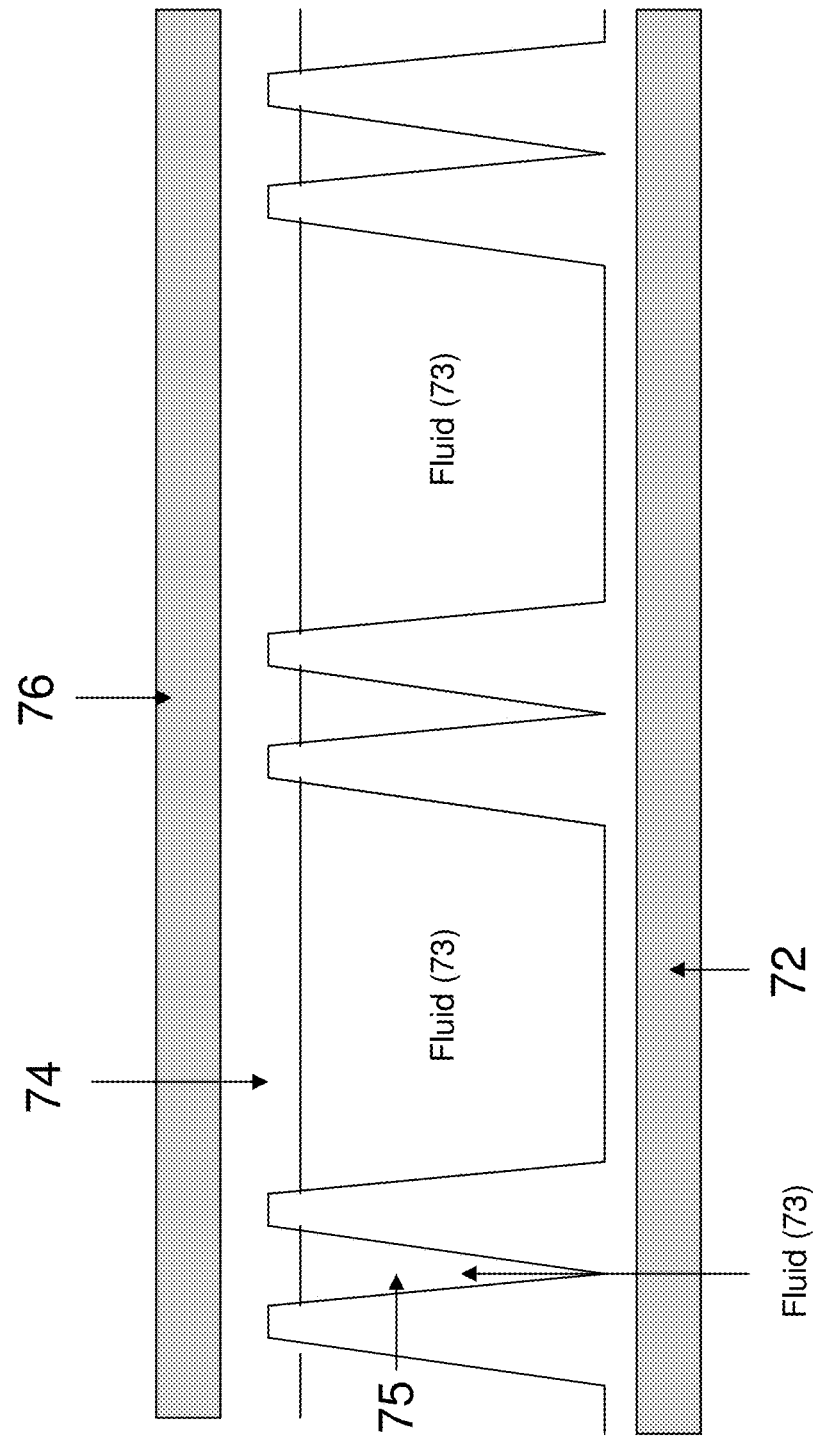
FIGS. 7a and 7b show a display device comprising the double wall structure between the microcups.

The microcups are typically formed on a light transmissive electrode layer (72) (such as an indium tin oxide layer), as shown in FIG. 7*a*. The microcups are then filled with a display fluid (73) and sealed with a sealing layer (74). The channel (75) between the two layers of the double wall is also filled and sealed. The filled and sealed microcups are then laminated with a second electrode layer (76), optionally with an adhesive layer (not shown).

Figure 7B:
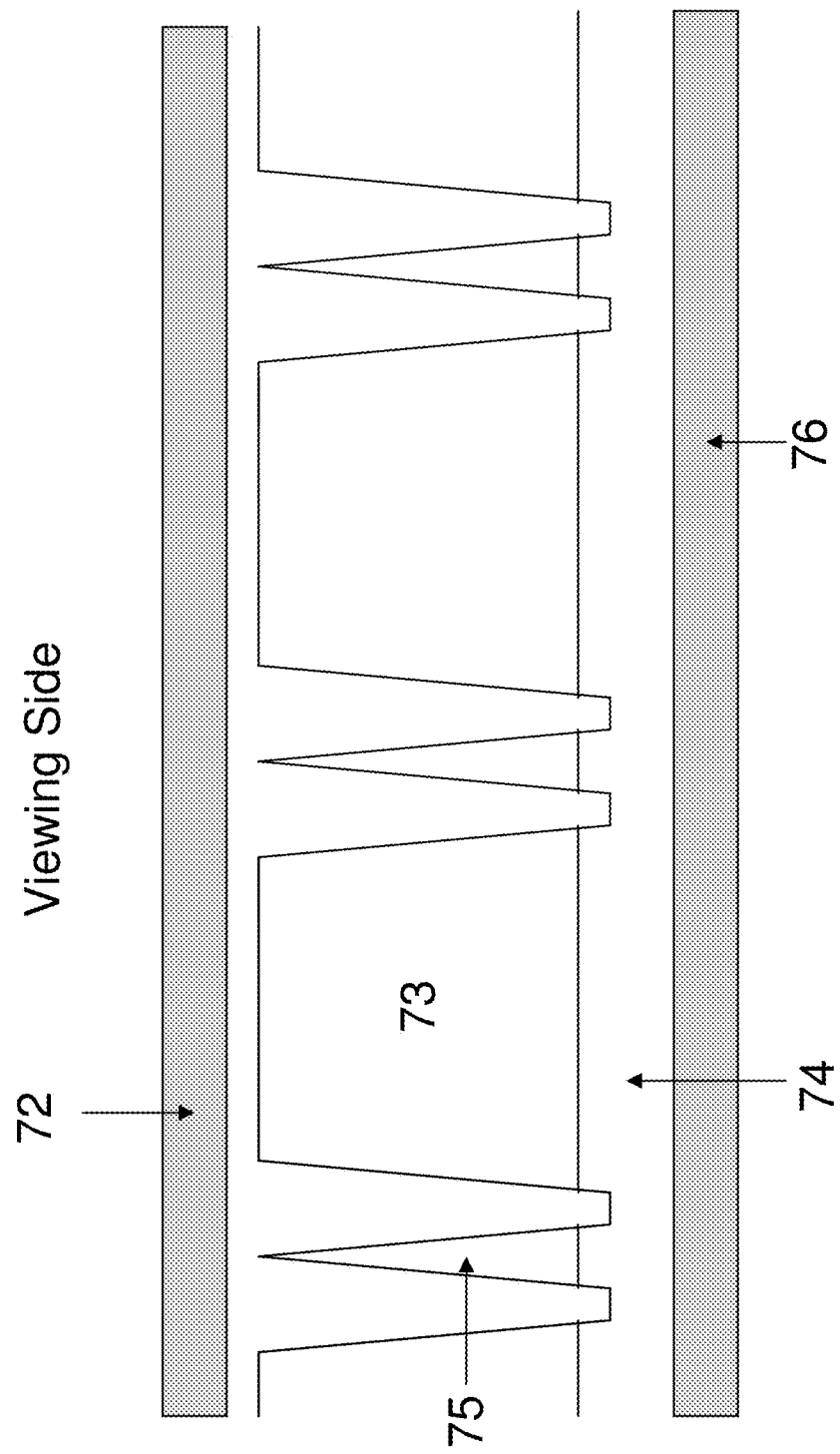

The microcup structure is usually viewed from the side of the light transmissive layer, as shown in FIG. 7*b*. For ease of illustration, FIG. 7*b* is the same as FIG. 7*a*, except turned 180°. While the channel portions (75) are filled with the display fluid, they have very little effect visually on the display.

Figure 8:
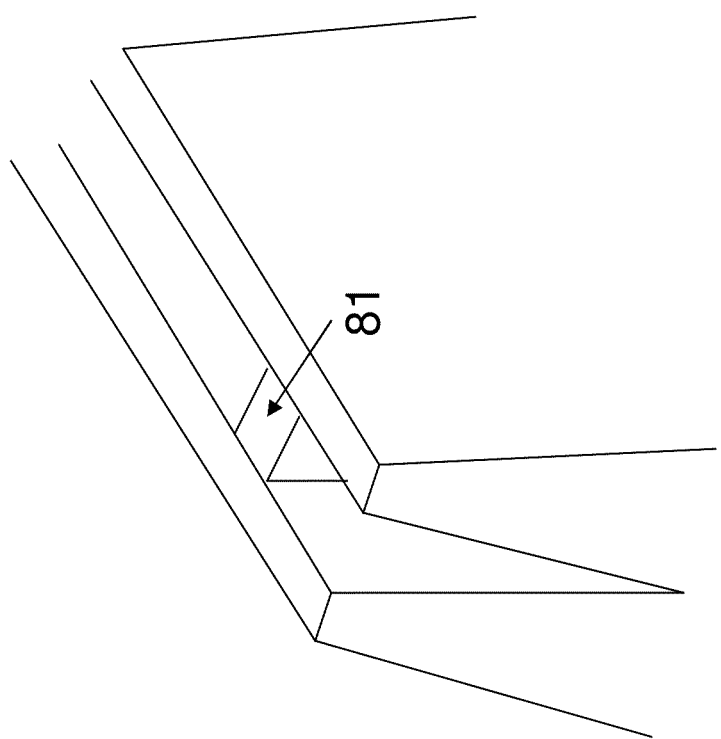
FIG. 8 illustrates the bridge in the channel of a double wall.

However, since the channels between the two layers of the double wall are connected throughout, if any one side of a double wall is damaged, the particles in the microcups may be pumped into this large connected area. Such a large connected area therefore may raise the defect probability. Consequently, it may be desirable to have bridges (81) between the two layers of the double walls as shown in FIG. 8 to prevent the channels from forming a connected large area.

Figure 9:
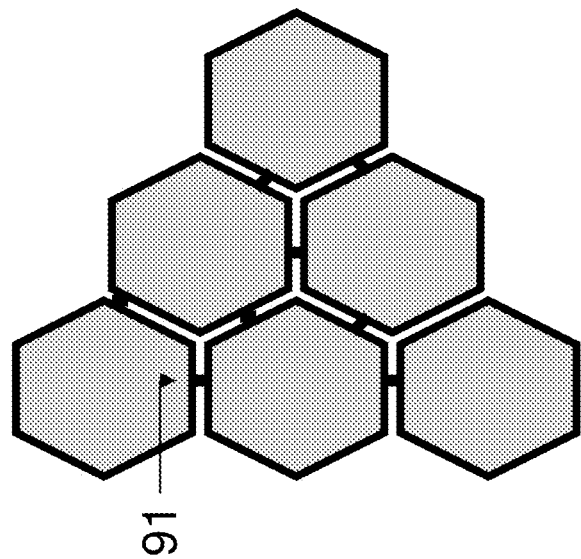
FIG. 9 shows a top view of microcups with bridges in the channel of a double wall.
Figure 9:
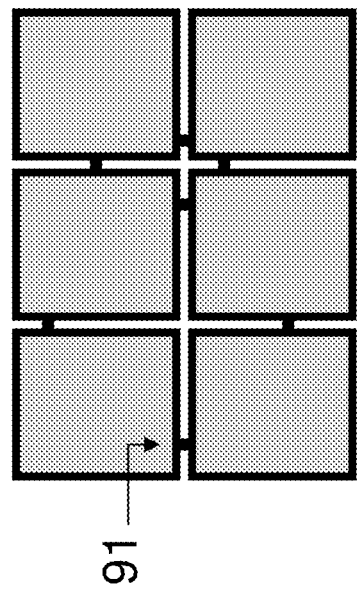

FIG. 9 is the top view of microcups with the double walls and bridges (91). It is preferable to have one bridge for each side of a microcup; however, this is not always necessary.

FIG. 10 shows the possible dimensions of a double wall. In one embodiment, the width ("a") of the base may be about 10 to about 60 microns. The width ("b") of each individual top area may be about 5 to about 20 microns and the total width ("c") of the top area may be about 10 to about 60 microns.

It is noted that the microcups in the first aspect of the present invention may also have double walls.

The microcups of the present invention, in both aspects of the invention, may be manufactured by the microembossing process described in U.S. Pat. No. 6,930,818, the content of which is incorporated herein by reference in its entirety. The formed microcups may then be filled and sealed also according to disclosures in this US patent.

The microcapsule-type display cells may also have double walls by having two layers of shell over the display fluid. They may be prepared by methods known in the art.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. An electrophoretic display comprising a viewing side which consists of two types of microcups, microcups of a first shape which has four or six sides and microcups of a second shape that is different from the first shape, wherein
    a) the two types of the microcups are filled with an electrophoretic fluid,
    b) the entire length of each of the four or six sides of one of the microcups of the first shape is shared with one of the microcups of the second shape, and each of the microcups of the first shape is surrounded by the microcups of the second shape in the entire viewing side, and
    c) the second shape is 90% or less of the first shape in area.

2. The display of claim 1, wherein the first shape is square and the second shape is rectangle.

3. The display of claim 1, wherein the first shape is hexagon and the second shape is triangle.

4. The display of claim 1, wherein the microcups have double walls separating any two neighboring microcups.

\* \* \* \* \*